United States Patent
Stoll et al.

(10) Patent No.: US 9,528,463 B2
(45) Date of Patent: Dec. 27, 2016

(54) METHOD OF MONITORING CHECK VALVES ARRANGED IN GAS FEED LINES OF A GAS ENGINE

(75) Inventors: Sascha Stoll, Ellgau (DE); Ingo Wilke, Tutzing (DE)

(73) Assignee: MAN Diesel & Turbo SE, Augsburg (DE)

( * ) Notice: Subject to any disclaimer, the term of this patent is extended or adjusted under 35 U.S.C. 154(b) by 605 days.

(21) Appl. No.: 13/563,954

(22) Filed: Aug. 1, 2012

(65) Prior Publication Data

US 2013/0054124 A1 Feb. 28, 2013

(30) Foreign Application Priority Data

Aug. 31, 2011 (DE) .................. 10 2011 081 928

(51) Int. Cl.
| | |
|---|---|
| F02D 41/22 | (2006.01) |
| F02M 21/02 | (2006.01) |
| F02D 19/02 | (2006.01) |
| F02D 41/00 | (2006.01) |
| F02B 19/12 | (2006.01) |

(52) U.S. Cl.
CPC .............. *F02D 41/22* (2013.01); *F02B 19/12* (2013.01); *F02D 19/025* (2013.01); *F02D 19/027* (2013.01); *F02D 41/0027* (2013.01); *F02M 21/0242* (2013.01); *F02M 21/0275* (2013.01); *Y02T 10/125* (2013.01); *Y02T 10/32* (2013.01); *Y02T 10/40* (2013.01)

(58) Field of Classification Search
CPC ... F02B 19/10; F02B 19/1009; F02B 19/1019; F02B 19/1023; F02B 19/1028; F02B 19/1057; F02B 19/1061; F02B 19/108; F02B 19/12; F02B 19/16; G01M 15/048
See application file for complete search history.

(56) References Cited

U.S. PATENT DOCUMENTS

| | | | | |
|---|---|---|---|---|
| 5,555,868 | A | * | 9/1996 | Neumann ..................... 123/275 |
| 6,092,370 | A | * | 7/2000 | Tremoulet et al. ............. 60/328 |
| 2004/0123849 | A1 | * | 7/2004 | Bryant ........................... 123/563 |

FOREIGN PATENT DOCUMENTS

DE    102007002752    11/2007

* cited by examiner

*Primary Examiner* — Hung Q Nguyen
*Assistant Examiner* — Anthony L Bacon
(74) *Attorney, Agent, or Firm* — Cozen O'Connor

(57) ABSTRACT

A method of monitoring check valves (6) arranged in gas feed lines (5) of a gas engine includes determining a temperature (S1) according to which a signal transmitter is activated (S3) when a detected temperature in a gas feed line (5) lies outside of a first designated target range; and transmitting (S3) a signal which carries information indicating the gas feed line (5) in which the temperature lying outside of the first target range was detected and/or the cylinder (10) with which the gas feed line (5) is associated.

5 Claims, 3 Drawing Sheets

METHOD OF MONITORING CHECK VALVES ARRANGED IN GAS FEED LINES OF A GAS ENGINE

BACKGROUND OF THE INVENTION

1. Field of the Invention

The present invention is directed to a method of monitoring mechanical or electronic check valves arranged in gas feed lines of a gas engine, to the use of the method and to a gas engine constructed for practicing the method.

2. Background of the Invention

In gas feed lines leading to a pre-chamber of a gas engine, a pressure-controlled check valve is generally installed directly adjacent to the pre-chamber. When the pressure on the side of the check valve remote of the pre-chamber is greater than the pressure on the side facing the pre-chamber—this pressure substantially corresponds to the pressure in the pre-chamber—a pressure force occurring because of the pressure difference holds the check valve open, usually against the action of a spring force. The flow cross section of the gas line is accordingly released and gas is conveyed into the pre-chamber.

However, if the combined forces of the spring force and the force exerted by the gas pressure on the side facing the pre-chamber exceed the force exerted on the side remote of the pre-chamber, the check valve closes and fluid is prevented from flowing back into the gas feed line. This situation occurs during the compression stroke of the gas engine. The compression pressure taking place in the main combustion chamber continues into the pre-chamber and the check valve is closed by the occurring pressure force. This prevents gas from flowing back into the gas feed line.

Check valves are exposed to high thermal and mechanical loads during the operation of a gas engine and therefore exhibit severe wear. After a certain operating time of the engine, the check valves are damaged, for example, due to dirt deposits, combustion residues and mechanical wear. Consequently, check valves often become leaky and, when a check valve leaks, hot, corrosive combustion gases can flow back into the gas feed line and damage other components.

Further, a leaky check valve will often cause uneven running of the engine and increased consumption of combustion gas. However, once a gas engine runs unevenly, it is often time-consuming to clarify the cause. Particularly in gas engines having a larger number of cylinders and check valves, much time must be spent to determine if one of the numerous check valves is defective. The expenditure involved in identifying a defective check valve makes the servicing of a gas engine laborious and expensive. Moreover, the time spent on servicing and, therefore, the costs incurred by servicing increase with the quantity of cylinders of the gas engine.

A method of monitoring a fuel supply installation in a vehicle which is provided for recognizing when a valve in the fuel supply installation is defective is known from DE 10 2007 002 752 A1. According to the known method, the fuel pressure and fuel temperature are detected in a portion of a fuel feed line between a fuel storage and a fuel consumer—i.e., a pre-chamber, for example—and an error signal is generated, and the fuel supply is interrupted when a change in the fuel pressure exceeds a given value during a given time period.

While it can be detected by means of the known method when a check valve is defective, the known method does not make it possible to avoid the expenditure on the servicing of the gas engine involved in identifying a defective check valve. Moreover, since a pressure sensor and a temperature sensor must be installed in the region of the gas feed lines in order for the known method to be carried out at all, it is relatively expensive and complicated to implement the known method.

Therefore, it is an object of the present invention to provide a method of monitoring check valves in a gas engine which allows the expenditure on servicing connected with the identification of a defective check valve to be reduced and which, in addition, can be implemented economically. In particular, the method according to the invention can be carried out without requiring as a precondition the installation of expensive devices in a gas engine for this purpose.

SUMMARY OF THE INVENTION

The present invention meets this object by providing a method of monitoring mechanical or electronic check valves arranged in gas feed lines of a gas engine by means of detecting a temperature, wherein, according to the method, a signal transmitter is activated when a detected temperature in a gas feed line lies outside of a first designated target range, a signal is transmitted which carries information indicating the gas feed line in which the temperature lying outside of the first target range was detected and/or the cylinder of the gas engine with which the gas feed line is associated. The present invention is also directed to the use of the method for cylinder specific and/or check valve-specific monitoring of mechanical or electrical check valves. Finally, the present invention is also directed to a gas engine having at least one pre-chamber and at least one sensor which is designed for detecting a temperature and which is arranged in a gas feed line leading to a pre-chamber and outfitted with a mechanical or electronic check valve wherein this sensor is arranged adjacent to a check valve or a gas valve.

In accordance with the method according to the invention, it is suggested to monitor check valves arranged in gas feed lines of a gas engine by detecting a temperature and activating a signal transmitter when a detected temperature in a gas feed line lies outside of a first designated target range. It is suggested to emit a signal carrying information indicating the gas feed line in which the temperature lying outside of the first target range was detected and/or the cylinder with which the gas feed line is associated. The terminology "first designated target range" has been chosen in order to delimit over a "second designated target range" introduced in the following description of a further development of the method.

The first designated target range for the temperature represents a range of values which indicates how high the temperature in the gas feed line should be when the check valve arranged in the gas feed line is functioning properly. This target range can be identical for all gas feed lines, or the first designated target range can be specified individually for each gas feed line. The latter is advantageous, for example, when gas feed lines leading to two combustion chambers of a gas engine may have different temperatures.

On the one hand, the method according to the invention can be used to monitor check valves of a gas engine having only one cylinder but a plurality of gas feed lines. On the other hand, it can also be used to monitor a multi-cylinder engine, wherein each cylinder can have one or more gas feed lines. In other words, the method according to the invention can be used to monitor a plurality of check valves which are arranged in different gas feed lines all of which lead to the same pre-chamber and also to monitor check valves which are arranged in gas feed lines some or all of which lead to different pre-chambers.

Further, the method according to the invention includes embodiments according to which a signal of the activated signal transmitter comprises information indicating the gas feed line in which the temperature lying outside of the first target range was detected. This information also shows which check valve is defective.

Instead of this or in addition thereto, the signal can also include information indicating the cylinder to which leads the gas feed line in which the temperature lying outside of the first target range was detected. This information is useful above all when the method is employed to monitor check valves in a multi-cylinder gas engine. In this connection, it should be observed that the two pieces of information mentioned above differ from one another when a plurality of gas feed lines of a gas engine lead to one cylinder.

According to a preferred embodiment, the temperature is detected in a gas feed line in a portion thereof adjacent to a check valve or in a portion adjacent to a gas valve. By gas valve is meant herein a valve—for example, an electrically actuated gas valve—which is designed for metering the maximum amount of fuel gas flowing through the gas feed line.

Further, the invention also includes embodiments according to which a temperature is detected in both of the above-mentioned portions of the gas feed line. Further, a device designed to detect temperature can be arranged inside the gas feed line or directly adjacent to the gas feed line.

The portion lying adjacent to the check valve is located on the side remote of the pre-chamber with respect to the check valve. In this portion, a defect in the check valve has a particularly pronounced effect on the temperature, and a measurement in this portion is therefore particularly informative.

According to a further development of the method according to the invention, the gas engine is switched off when the detected temperature in a gas feed line lies outside of a second designated target range. Further, the first designated target range and second designated target range can be identical or can differ from one another. The second target range is preferably selected so as to be larger than the first target range.

If the detected temperature lies outside of only the first target range, the signal transmitter is activated, but the engine is not yet switched off. However, if the temperature also lies outside of the second target range, not only is the signal transmitter activated but the engine is also switched off in addition. On the one hand, this can prevent the engine from being switched off unnecessarily when a defective check valve has been identified but the temperature deviation in the gas feed line is tolerable, so that when the engine is put into operation again provisionally there is no risk of damage to other components, for example, when there is a gradually progressing defect in the check valve. On the other hand, it can be ensured that the engine is immediately switched off when the temperature deviation in the gas feed line increases beyond the tolerable value.

According to a further development of the invention, the first target range and/or second target range of temperature in a gas feed line are/is specified as a function of the operating duration of the gas engine, the load condition of the gas engine, or a pressure in a combustion chamber or in a gas feed line.

The temperature in a gas feed line is a function of the operating duration among others. When an engine is started cold, the combustion chamber and the pre-chamber are still cold; however, if the engine has already been running longer, the combustion chamber is hot. The temperature in the pre-chamber also affects the temperature in the gas feed line. In order to take into account this dependency of temperature on operating duration, the first and/or second target range of temperature can be designated as a function of the operating duration.

When a gas engine is operated under different load conditions, different pressure curves and temperature curves also occur in the main combustion chamber and in the pre-chamber. In order to take this dependency into account, the first and/or second target range for the temperature can also be designated as a function of the load condition.

Further, the first target range and/or the second target range can also be designated as a function of a pressure, for example, as a function of the mean pressure in a combustion chamber. When the composition of the fuel gas used in the gas engine changes, the temperature in the combustion chambers and in the gas feed lines must also be expected to change. This dependency is taken into account in that the first and/or second target range of temperature are/is specified, for example, as a function of the mean pressure in the combustion chamber.

Another possibility consists in that the first and/or second target range are/is specified as a function of the pressure in a gas feed line. When a different fuel gas composition is used, a different pressure may also be necessary in the gas feed line for optimal combustion. Accordingly, the pressure in the gas feed line can be viewed as a clue to the fuel gas being used, and the target range can be correspondingly adjusted to this pressure.

According to a further development of the method according to the invention, the signal transmitter is not activated until the detected temperature lies outside of the first designated target range over a designated period of time. In this way, for example, a measurement error in detecting temperature or a brief, temporary deviation in temperature in the gas feed line which is not caused by a defect in a check valve can be prevented from triggering a signal of the signal transmitter.

Also, the gas engine is preferably not switched off until the detected temperature lies outside of the second designated target range over a second designated period of time so that a measurement error or a brief, temporary deviation in temperature does not also switch off the engine unnecessarily. Further, the first designated time period and the second designated time period can be identical or can differ from one another.

The method according to the invention can be used for cylinder-specific and/or check valve-specific monitoring of check valves. By cylinder-specific monitoring is meant an embodiment form of the method according to which information indicating the cylinder with which is associated the gas feed line in which a temperature lying outside of the first and/or second target range has been detected is transmitted to the user of the method.

By check valve-specific monitoring is meant an embodiment form of the method according to which information indicating the gas feed line in which the temperature lying outside of the first and/or second target range has been detected is transmitted to the user of the method. The check valve-specific monitoring is particularly suitable for use in engines with cylinders having a plurality of gas feed lines. The method is suitable for engines having only one cylinder and a plurality of gas feed lines as well as for engines having a plurality of cylinders which each have one or more gas feed lines.

A gas engine which is advantageously designed for use of the method has at least one pre-chamber and at least one sensor designed for detecting a temperature, wherein this sensor is arranged in a gas feed line which is outfitted with a check valve and which leads to a pre-chamber.

The sensor can be arranged, for example, either adjacent to the check valve or adjacent to a gas valve which is arranged in the gas feed line. Further, a sensor designed for detecting a temperature can be arranged in an individual gas feed line adjacent to the check valve and also adjacent to the gas valve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention will be described more fully by way of example with reference to the accompanying drawings, in which.

DETAILED DESCRIPTION OF THE PRESENTLY PREFERRED EMBODIMENTS

Figure 1:
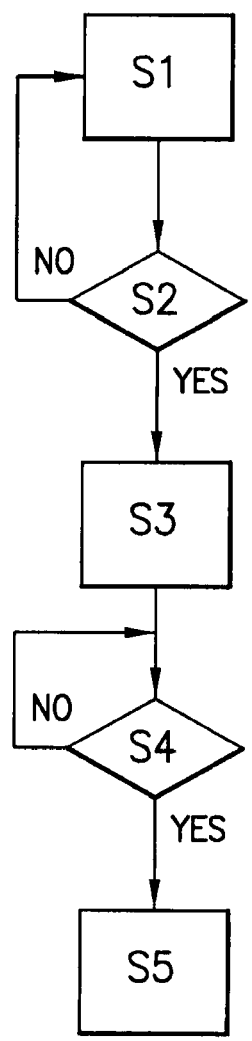
FIG. 1 is a block diagram of an embodiment of the method according to the invention.

FIG. 1 shows a block diagram of an embodiment of the method according to the invention. To illustrate the method, reference is also made in the following to the gas engine 13, shown only schematically in FIGS. 2a and 2b, which shows a cylinder of a large gas engine for stationary operation, not shown in more detail, having a plurality of cylinders and with pre-chamber ignition, wherein every cylinder has a pre-chamber with two gas feed lines.

The first cylinder—"cylinder A"—has, for example, two gas feed lines "line A1" and "line A2"; the second cylinder—"cylinder B"—has gas feed lines "line B1" and "line B2", and so on. A check valve is arranged in every gas feed line; accordingly, the gas engine has a corresponding total number of check valves.

In a first step S1, a temperature is determined in all gas feed lines of the engine. A first target range for temperature is specified for each of the gas feed lines. In the illustrated embodiment form of the method, the first designated target range is identical for all gas feed lines.

In a second step S2, it is determined for each individual detected temperature whether or not this temperature lies outside of the first designated target range over a first designated time period. In the illustrated embodiment, the first designated time period is one minute, for example. If this is not the case for all of the detected temperatures, it is assumed that all of the check valves are functioning properly. In this case, the process returns to step S1 and the temperatures in the gas feed lines are detected again, for example, at a predetermined time interval after the first detection.

Conversely, if it is determined in step S2 that at least one of the detected temperatures over the course of the first designated time period lies outside of the first designated target range, the process moves to a next step S3. Purely for the sake of illustration, it is assumed in the following that a temperature lying outside of the first designated target range has been detected in the first gas feed line of the second cylinder, i.e., in "line B1." Therefore, the check valve in "line B1" is defective.

In step S3, a signal transmitter is activated and transmits a signal carrying information indicating the gas feed line in which the temperature lying outside of the target range was detected and additionally transmits information indicating the cylinder with which this gas feed line is associated. In the exemplary case mentioned above, the information that a check valve in cylinder "B" has failed and that this involves gas feed line "B1" is transmitted by the activated signal transmitter.

In a next step S4, it is checked whether the detected temperature lying outside of the first designated target range also lies outside a second designated target range during a second designated time period, which is again one minute in the illustrated embodiment of the method. If this is not the case, the gas engine continues to run and step S4 is carried out again. In this case, a user of the engine must make the decision when to perform servicing. Accordingly, the user is alerted that the check valve in gas feed line B1 has begun to malfunction but can still continue to be operated. The user can wait for an opportune moment to perform maintenance.

If, on the other hand, it is determined in step S4 that the detected temperature lies outside of the second designated target range, the process moves to step S5. In step S5, the engine is switched off.

If a defective check valve has been identified and the engine is subsequently serviced, the defective check valve can be directly replaced without needing to search through all of the check valves for defects. When the defective check valve has been replaced and the engine is returned to operation, the method can be implemented again starting from step S1.

Figure 2A:
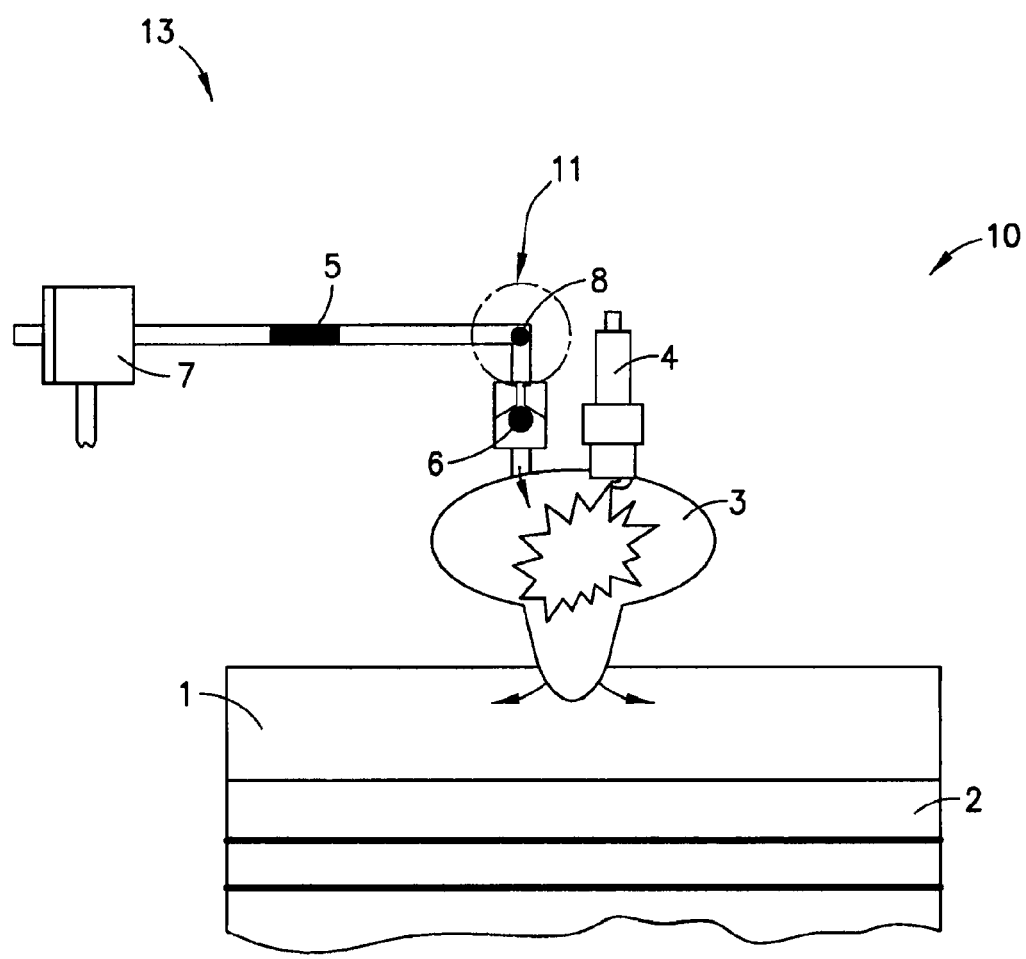
FIG. 2a is a schematic diagram showing a portion of a first embodiment of a gas engine which is advantageously designed for use of the method.
Figure 2B:
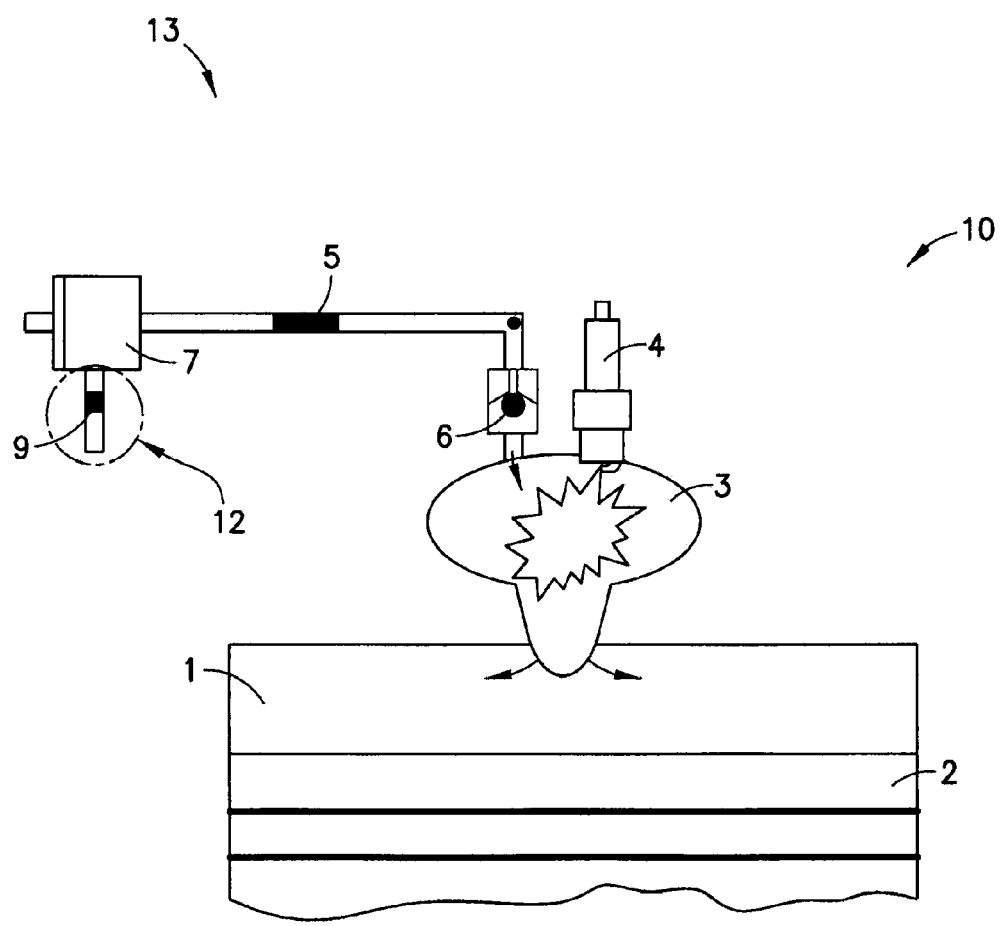
FIG. 2b is a schematic diagram showing a portion of a second embodiment of a gas engine which is advantageously designed for use of the method.

FIGS. 2a and 2b show schematic diagrams of portions of two embodiment forms of a gas engine 13 which is advantageously designed for use of the method. The two gas engines 13 differ merely with respect to where in a gas feed line a device for detecting the temperature is arranged. FIG. 2a and FIG. 2b each show part of a cylinder 10 with a main combustion chamber 1, a piston 2 and a pre-chamber 3. Further, the pre-chamber 3 has a spark plug 4 and a gas feed line 5. Further, a check valve 6 is arranged adjacent to the pre-chamber 3 in the gas feed line 5, and a gas valve 7 is arranged in an area of the gas feed line 5 farther away from the pre-chamber 3.

In the embodiment shown in FIG. 2a, a thermocouple 8 for detecting a temperature is arranged in a portion 11 of the gas feed line 5 adjacent to the check valve 6. Conversely, in the embodiment shown in FIG. 2b, a thermocouple 9 for detecting a temperature is arranged in a portion 12 of the gas feed line 5 located adjacent to the gas valve 7. As regards the advantages associated with the respective arrangement of the thermocouples 8, 9, reference is made to the preceding description.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of monitoring mechanical or electronic check valves arranged in gas feed lines of a gas engine by means of detecting a temperature using one sensor arranged adjacent to one of a check valve (6) and a gas valve (7), said method comprising:

detecting, by the sensor, the temperature in a portion (11) of a gas feed line located adjacent to the check valve (6) or in a portion (12) located adjacent to the gas valve (7);

activating a signal transmitter when a detected temperature by the sensor in a gas feed line lies outside of a first designated target range;

transmitting the signal which carries information indicating one of the gas feed line (5) in which the temperature lying outside of the first target range was detected and the cylinder (10) of the gas engine (13) with which the gas feed line (5) is associated;

identifying the check valve as defective based on the transmitted signal; and designating the defective check valve for replacement when the temperature is outside of the first target range; and switching off the gas engine (S5) when the detected temperature in the gas feed line (5) lies outside of a second designated target range due to the defective check valve.

2. The method according to claim 1, characterized in that at least one of a first and second target range of the temperature in a gas feed line (5) is specified as a function of at least one of an operating duration and load condition of the gas engine or a pressure or both.

3. The method according to claim 1, wherein the signal transmitter is activated (S3) when the detected temperature lies outside of the first designated target range over a first designated time period.

4. The method according to claim 1, additionally comprising the step of switching the engine off (S5) when the detected temperature lies outside of the second designated target range over a second designated time period.

5. A gas engine comprising:

at least one pre-chamber (3);

at least one sensor (8, 9) constructed for detecting a temperature and arranged in a gas feed line (5) leading to said pre-chamber (3) and outfitted with a mechanical or electronic check valve (6), said sensor (8, 9) arranged adjacent to one of a check valve (6) and a gas valve (7); and a signal transmitter that is activated when a detected temperature by the at least one sensor lies outside of a first designated target range and configured to transmit a signal which carries information indicating one of the gas feed line (5) in which the temperature lying outside of the first target range was detected and a cylinder (10) of the gas engine (13) with which the gas feed line (5) is associated to designate the one of a check valve (6) and a gas valve (7) as defective and identified for replacement; and a shut off configured to switch off the gas engine when the detected temperature in the gas feed line (5) lies outside of a second designated target range.

* * * * *